United States Patent [19]

Walles

[11] Patent Number: 5,261,764
[45] Date of Patent: Nov. 16, 1993

[54] IN SITU CONVERSION OF A SINGLE WALLED TANK TO A DOUBLE WALLED TANK

[76] Inventor: Wilhelm E. Walles, 6648 N. River, Freeland, Mich. 48623

[21] Appl. No.: 920,859

[22] Filed: Jul. 28, 1992

[51] Int. Cl.⁵ ............................................. B65D 87/00
[52] U.S. Cl. ..................................... 405/52; 427/341; 156/287; 156/294; 220/469; 405/53
[58] Field of Search .............. 405/52, 146, 154, 150.1, 405/53; 156/287, 294; 138/97; 427/230, 340, 341, 388.4; 220/469, 470, 420

[56] References Cited

U.S. PATENT DOCUMENTS

| | | | |
|---|---|---|---|
| 3,068,561 | 12/1962 | Jones | 405/53 X |
| 3,537,267 | 11/1970 | Webb | 405/53 |
| 4,480,411 | 11/1984 | Balz et al. | |
| 4,588,622 | 5/1986 | Sukarie | |
| 4,798,496 | 1/1989 | Sawada | 405/52 X |
| 4,817,817 | 4/1989 | Palazzo | |
| 4,846,604 | 7/1989 | Holtmann | 405/129 X |
| 4,860,916 | 8/1989 | Winters | |
| 4,897,135 | 1/1990 | Aylor, Jr. et al. | |
| 4,976,290 | 12/1990 | Gelin et al. | 405/150.1 X |
| 5,017,044 | 5/1991 | Sharp | |

FOREIGN PATENT DOCUMENTS

| | | | |
|---|---|---|---|
| 0069944 | 1/1983 | European Pat. Off. | 405/53 |
| 1243375 | 6/1967 | Fed. Rep. of Germany | 405/53 |
| 2658968 | 6/1978 | Fed. Rep. of Germany | |
| 1133581 | 11/1968 | United Kingdom | 405/53 |

*Primary Examiner*—Dennis L. Taylor
*Attorney, Agent, or Firm*—Cargill & Bliss

[57] ABSTRACT

A method for in situ conversion of an original single walled tank 10 into a resultant double walled tank 24 for storing a material 14 is disclosed. The resultant double walled tank 24 has an outer wall 22 and an inner wall 26. Each wall 22 & 26 of the double walled tank 24 has an interior surface 28 & 30. The first step of the preferred method is to provide the original single walled tank 10 for in situ conversion into the resultant double walled tank 24. The original single walled tank 10 forms the outer wall 22 of the resultant double walled tank 24. The second step of the preferred method is to install a sensor 32 to monitor failure of either wall 22 & 26 of the resultant double walled tank 24. The third step is to install at least one plastic coating 34 over the interior surface 28 of the outer wall 22 to form the inner wall 26 of the resultant double walled tank 24, the plastic coating 34 being such that at least some of hydrogen atoms in the coating 34 can be replaced with other ions upon reaction. The fourth step of the method is to react the plastic coating 34 to replace at least some of the hydrogen atoms with other ions to create a barrier 35 that is substantially impenetrable to the material 14 stored in the resultant double walled tank 24.

34 Claims, 2 Drawing Sheets

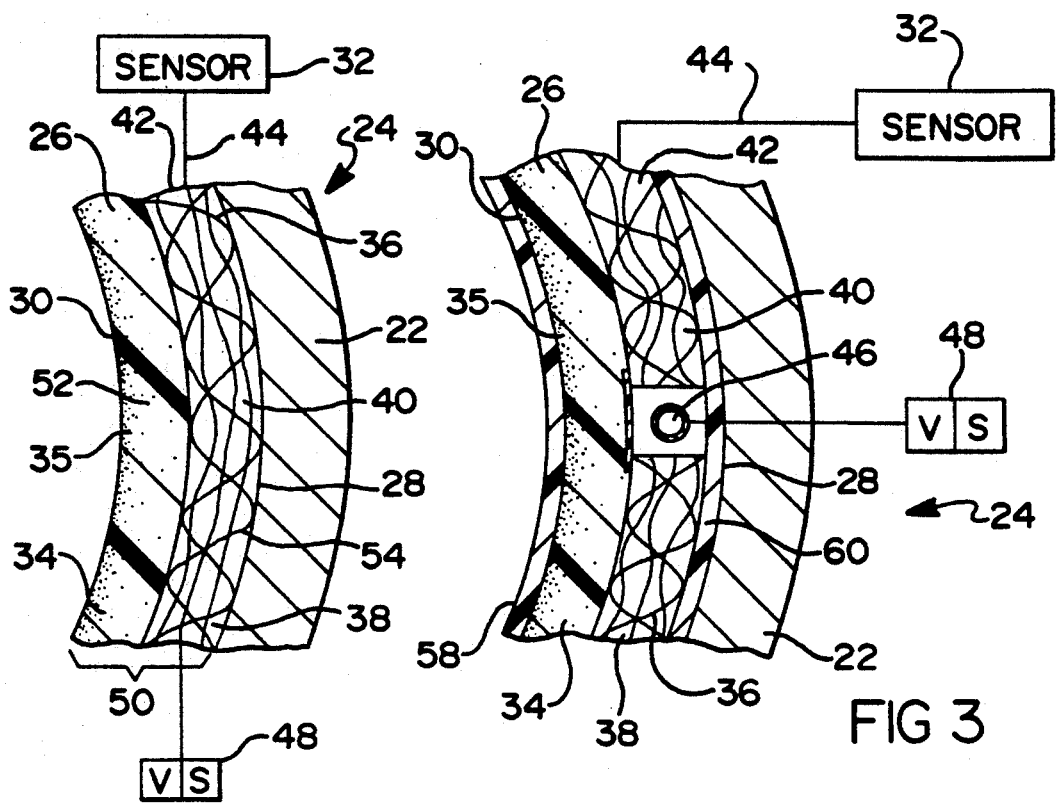
FIG 5
FIG 3
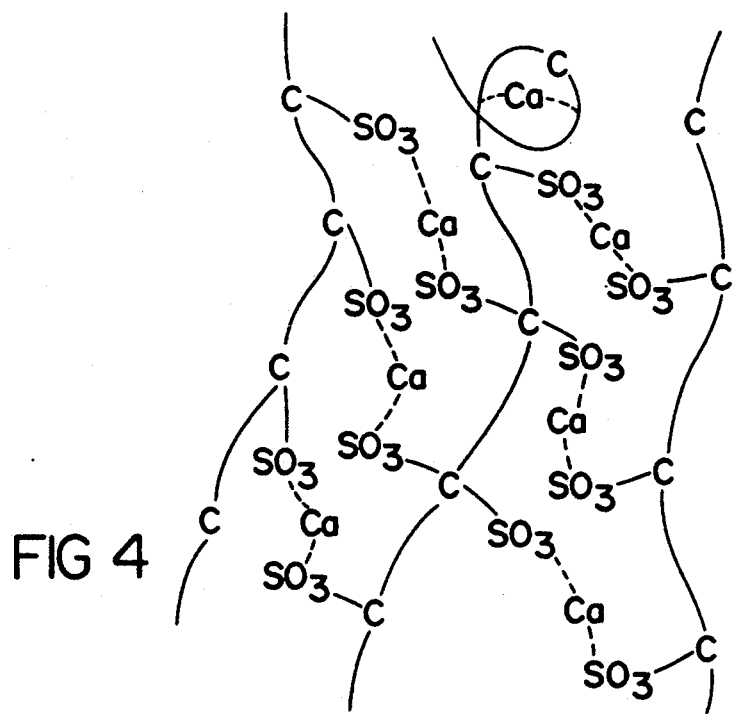
FIG 4

IN SITU CONVERSION OF A SINGLE WALLED TANK TO A DOUBLE WALLED TANK

TECHNICAL FIELD

This invention relates generally to double walled tanks for storing materials, but more particularly to a method for the in situ conversion of an original single walled tank into a resultant double walled tank for storing a material, the resultant double walled tank to include sensing means to monitor failure of either of the walls of the double walled tank.

BACKGROUND OF THE INVENTION

Traditionally, single walled tanks have been to store and transport liquid materials. widely used Such tanks have usually been constructed from steel, because of the affordability and structural stability of single walled steel tanks. Single walled steel tanks have been used underground, above ground, on railroad cars, and on ships as holding tanks. They have been used to hold a wide variety of materials, including gasoline, toxic and hazardous wastes, and even benign substances such as tomato juice. Single walled steel tanks, however, are prone, over time, to deterioration and failure. If used underground, they may rust, remove space both from the outside and from the inside. Such deterioration is difficult to detect, because it is underground. If used above ground, deterioration is usually less rapid and may be more visible, if occurring on the outside of the tank. Nonetheless, pinhole size leaks are very difficult to detect, even on the outside of above ground tanks.

Single walled tanks made from materials other than steel are prone to similar and/or other problems, all involving undetected tank failure. Even a minute failure, undetectable via visual detection, can be extremely serious, if very toxic or hazardous materials are being stored in the failed tank. Just one gallon of gasoline can contaminate one million gallons of drinking water.

Yet gasoline is one of the safer materials commonly stored in existing single walled tanks as other materials, such as dioxins, fluorinated and chlorinated hydrocarbons, ammonia, toluene and so on, are far more dangerous.

Moreover, it is estimated that there are between 7 and 15 million underground tanks in the United States storing liquids that are regulated by the EPA. Further, there are millions of additional above ground storage tanks, railroad cars and ship transport tanks which are used to store or to transport liquids governed by EPA regulations. Environmental disasters have already occurred. Highly publicized leaks and spills of hazardous and toxic materials have clarified the need to regulate and prevent spills and other leakage of such materials into the environment.

In 1983, the EPA began regulating the storage of gasoline and certain other materials in underground tanks. Many states have passed stricter regulations extending to above ground storage of various materials. This trend to regulate the storage and transport of hazardous or toxic materials in tanks of all types is almost certain to continue.

The trend is to require storage and transport of hazardous and toxic materials in double walled tanks with a monitoring device installed to detect leakage between the walls of the tank, thus detecting the failure of either wall of the tank. The EPA and many states have already adopted such requirements for the storage or transport of many materials in particular situations. This trend will almost certainly result in more regulation, not less.

Thus, there is an urgent need to replace or convert literally millions of existing single walled storage tanks into double walled storage tanks with monitoring systems to detect leakage between the walls of the tank.

Nonetheless, the cost of replacing existing tanks is usually quite high. In the case of underground storage tanks, the old tank must be dug up and disposed of, and a new double walled tank must be purchased and installed. Replacing above ground storage tanks does not involve the extensive dig-up costs, but still requires the total capital cost of replacing the old tank with a more sophisticated and expensive tank. These capital intensive replacements would be even worse for railroad cars and large ship holding tanks.

Conventional methods exist for digging up existing underground storage tanks and retrofitting them with an added outer wall and monitoring system meeting all current EPA and state requirements. These same methods may be used to retrofit outer-coat above ground storage tanks, railroad cars, and large ship holding tanks.

Nonetheless, such methods suffer from several important drawbacks. First, digging up existing tanks and retrofitting them is an expensive proposition. It is almost as expensive, in many cases, as simply digging up the old tank and replacing it with a new tank. In such a case it usually makes sense to go with a brand new tank.

Second, in the case of above ground tanks, railroad cars, and ship holding tanks, the outer layer of the original tank is exposed, meaning that it must have certain minimum structural and damage resistance characteristics. If it has been decided that a new outer layer wall must be added to comply with EPA regulations, this generally results in the new outer layer being more costly than it would need to be if it were installed on the inside.

Further, not all retrofitted outer-wall double walled tanks have proven acceptable. Simple polyethylene liners have proven difficult to monitor for tank wall failure. Double walled fiberglass reinforced plastic tanks have also been used, but generally rejected because they generally do not have a sufficient gap between the walls to monitor and act on leaks between the walls before actual leakage to the environment has occurred.

Methods also exist for retrofit coating the inner surface of an existing single walled tank to create a double walled tank. Nonetheless, such existing methods have not resulted in acceptable tanks due to lack of durability of the inner surface lining used and/or due to permeability, albeit slight, of the lining, which can give false alerts to any leak sensing device being used.

Thus, an improved method for in situ conversion of old single walled tanks into acceptable double walled tanks by retrofit inner-coating existing single walled tanks is desperately needed. Ideally, such a method would: (1) be simple and cost efficient to implement; (2) not require costly, rare or dangerous materials; and (3) result in an acceptable double walled tank meeting all current and foreseeable regulatory requirements.

The most important attempts to solve these problems by previous methods are described in the following patents. USPN 4,817,817, issued to David T. Palazzo on Apr. 4, 1989, discloses a typical method of in-factory manufacturing of a double walled tank with interstitial monitoring for leakage. His method includes applying a release agent over the single walled tank and then applying a substantially rigid outer sheath of a curable synthetic resin thereover that, when cured, may be broken free from engagement with the inner tank.

German Pat. No. DT 2658-968, issued to Harry Haase on Jun. 6, 1978, discloses a double walled underground storage tank for liquids having walls constructed of glass-fibre-reinforced plastics, with an intermediate leakage control space filled with an air and liquid permeable material which also supports both walls against each other. The leakage control space is filled throughout with a plastic containing concrete which forms the static-load bearing layer of the tank. The plastic containing concrete forms an integral unit with the inner and outer walls.

European Patent Application 0069944, filed Jul. 3, 1982, discloses a method for restoring steel containers including coating their inner surfaces with a laminated resin, the strength of which corresponds to that of the container. A spacer layer is applied by spraying with a reinforcing particle-containing resin composition.

In summary, prior art and existing storage and transport tanks have been shown to be extremely prone to failure and environmental disasters of varying magnitudes. Accordingly, the EPA and many states have passed various regulations regarding the storage and transport of toxic and hazardous materials in tanks. One very desirable tank configuration is a double walled tank with interwall monitoring to detect failure of either wall of the tank. Environmental spills and leaks may thus be curtailed before they occur.

Moreover, it is desirable to retrofit existing tanks because of the cost of replacing most existing tanks. It is also desirable to retrofit the inside surface of existing tanks, in most cases, because of savings incurred by not having to dig up buried tanks. Further, it is generally cheaper and more efficient to coat the inner surface of existing above ground tanks because inner coatings do not have to be load bearing and may be constructed less rigidly, again saving in cost and making installation easier. Finally, it is desirable to have a durable inner coating that is completely impenetrable to water and to the material being stored in the tank.

Accordingly, the primary object of the present invention is to provide an improved method for in situ conversion of existing single walled tanks into resultant double walled tanks for storing toxic and hazardous materials that can be monitored for failure of either wall of the double walled tank.

It is also an object of the present invention to provide a safe and environmentally desirable method for workers and installers while performing the in situ conversion of existing single walled tanks in accordance with the instant invention.

It is also an object of the present invention to provide a double walled tank by the method of the present invention whose inner wall is substantially impenetrable to water and to the material being stored therein.

It is also an object of the present invention to provide an improved double walled tank for storing toxic and hazardous materials.

SUMMARY OF THE INVENTION

In accordance with the preferred embodiment of the invention, these and other objects of the invention are addressed as follows. A method for in situ conversion of an original single walled tank into a resultant double walled tank for storing a material is disclosed. The resultant double walled tank has an outer wall and an inner wall. Each wall of the double walled tank has an interior surface. The first step of the method is to provide the original single walled tank for in situ conversion into the resultant double walled tank. The original single walled tank will form the outer wall of the resultant double walled tank. The second step of the method is to install a sensor for monitoring failure of either wall of the resultant double walled tank. The third step is to install at least one plastic coating over the interior surface of the outer wall to form the new inner wall of the resultant double walled tank. The plastic coating is selected so that at least some of the hydrogen atoms in the coating can be replaced with other ions upon reaction. The fourth step of the method is to react the plastic coating to replace at least some of the hydrogen atoms with other ions to create a barrier that is substantially impenetrable to the material stored in the resultant double walled tank.

In the preferred embodiment, the step of installing at least one plastic coating is accomplished by installing at least one sulfonatable coating over the interior surface of the outer wall and the step of reacting the plastic coating to replace at least some of the hydrogen atoms is accomplished by sulfonating the plastic coating to create a barrier that is substantially impenetrable to the material stored in the resultant double walled tank.

Preferably, a stand-off support to define an intermediate zone is also installed between the walls of the double walled tank so that fluids and gases may migrate freely within the intermediate zone and be detected by the sensor. Any conventional or suitable method of support may be used, but preferred stand-off supports would include metal, plastic, fiber, and woven or non-woven fabric mesh. It has also been found to be effective to use a vacuum in the intermediate zone to capture any fluids or gases which may be migrating within the intermediate zone. These fluids and gases are then detected and/or analyzed by the sensor to detect failure of either of the walls of the double walled tank. A network of fluid and gas collection tubes may be installed in the intermediate zone to provide the vacuum and to detect failure quickly and efficiently within the entire intermediate zone.

The plastic coating which forms the new inner wall may be any plastic, although certain plastics are preferred because they are capable of replacement reaction with the hydrogen atoms in the plastic. Of these plastics, ethylene acrylic acid co-polymer is the preferred plastic inner coating material. In the event that the plastic is sulfonated, it is also preferred that the molecules of the sulfonated plastic inner coating be cross-linked by yet another reaction with a divalent or trivalent metal ion, preferably calcium.

In an alternative embodiment of the present invention, the objects of the present invention are accomplished as follows. Again, a method for in situ conversion of an original single walled tank into a resultant double walled tank for storing a material is disclosed. The resultant double walled tank has an outer wall and an inner wall. Each wall of the double walled tank has an interior surface facing the center of the tank. The first step of this alternative method is to provide the original single walled tank for in situ conversion into the resultant double walled tank. The second step is to install a sensor, as described in more detail below, to detect failure of either wall of the double walled tank.

The third step is to apply a film stand-off support laminate to the inner surface of the outer wall. The film portion of the film stand-off support laminate is a sulfonatable plastic, preferably an ethylene acrylic acid copolymer containing about 20% by weight of acrylic acid based upon the total weight of the copolymer. The stand-off support portion of the film stand-off support laminate defines an intermediate zone and is preferably composed of a metal, plastic, fiber, or woven or non-woven fabric mesh. The sensor acts upon the intermediate zone to detect failure of either wall of the double walled tank. This is preferably done as was outlined above under the preferred embodiment. Next, the plastic inner wall is sulfonated to create a barrier that is substantially impenetrable to the material stored in the double walled tank. Again, the molecules of this sulfonated layer are preferably cross-linked by reaction with a divalent or trivalent metal ion, preferably calcium.

Under either of the above embodiments, the interior surface of the original single walled tank should be cleaned and repaired before performing the instant method. Moreover, an adhesive layer may be applied to the interior surface of the original single walled tank so that the stand-off support and fluid and gas collection tubes of the preferred embodiments may be attached to the interior surface of the original single walled tank by simply pressing them to the adhesive layer. The adhesive layer may be formed by spraying a suspension of polyethylene co-acrylic acid ammonium salt on the interior surface of the original single walled tank and slightly drying the layer to produce a tacky surface so that the stand-off support and fluid and gas collection tubes may be pressed thereto. Later, the suspension may be fully dried to produce a water impermeable layer. A protective coating may be applied over the interior surface of the inner wall to prevent abrasive damage to the inner wall under any embodiment.

Further in accordance with the present invention, a double walled tank made by the method of the present invention is disclosed. Each wall of the double walled tank has an interior surface facing the center of the tank. The double walled tank includes an original single walled tank, which forms the outer wall of the resultant double walled tank. The double walled tank also includes a stand-off support which defines an intermediate zone and allows fluids and gases to migrate throughout the intermediate zone. Preferred stand-off supports include metal, plastic, fiber, and woven or non-woven fabric mesh. A sensor is included within the intermediate zone to determine when either wall of the double walled tank has failed. The double walled tank includes at least one sulfonated plastic coating which forms the inside wall of the double walled tank and which is impenetrable to the material being stored in the double walled tank. A vacuum may be used in the intermediate zone to capture fluids and gases which are migrating therein. These fluids and gases are analyzed by the sensor to detect failure of either of the walls of the double walled tank. A network of fluid and gas collection tubes may be installed in the intermediate zone to detect failure quickly and efficiently within the entire intermediate zone. Ethylene acrylic acid co-polymer containing about 20% by weight of acrylic acid is the preferred plastic inner coating material. It is also preferred that the molecules of the sulfonated plastic inner coating, described above, be cross-linked by reaction with a divalent or trivalent metal ion, preferably calcium.

Therefore, a new method for in situ conversion of single walled tanks into double walled tanks is disclosed as well as the double walled tank formed by the method. The objects and advantages of the present invention are met by the method and by the disclosed double walled tank.

BRIEF DESCRIPTION OF THE DRAWINGS

The nature and extent of the present invention will be clear from the following detailed description of the particular embodiments thereof, taken in conjunction with the appendant drawings, in which:

FIG. 3 shows a cross-sectional view of a wall segment of the double walled tank of the present invention, including (1) an outer wall, (2) an adhesive layer, (3) an intermediate zone defined by a stand-off support, (4) fluid and gas collection tubes, and (5) a reacted plastic inner wall;

FIG. 4 shows several long sulfonated hydrocarbon polymer chains which have been cross-linked by reaction with calcium; and FIG. 5 shows a cross-sectional view of a well segment of a double walled tank constructed pursuant to the method of the present invention, including (1) an outer wall, (2) a film stand-off support laminate, and (3) a sulfonated plastic inner wall.

DETAILED DESCRIPTION OF THE INVENTION

Figure 1:
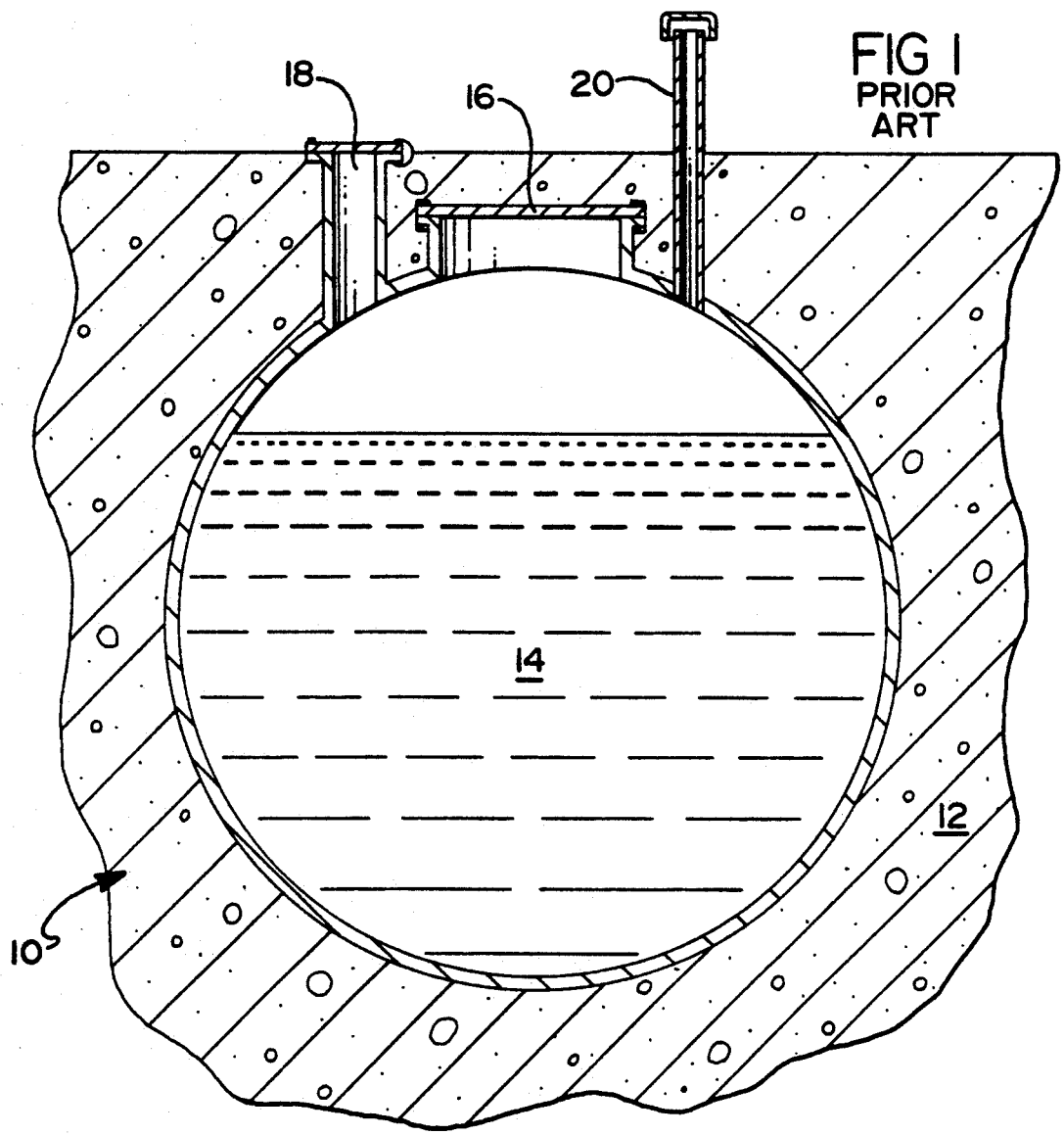
FIG. 1 shows a cross-sectional view of a prior art in situ single walled tank storing a liquid material.

Referring first to FIG. 1, a prior art single walled tank is generally denoted by the numeral 10. Single walled tank 10 is shown in situ, buried in the ground 12, while holding material 14. Single walled tank 10, as shown, could be an underground gasoline storage tank. Tank 10 is shown with manhole cover 16, fill tube 18, and vent 20 which allows air pressure equalization while the tank is being filled or drained.

Although an underground tank is depicted in FIG. 1, the present invention is applicable to any in situ tank and is not restricted to underground tanks. Any single walled tank can be converted into a double walled tank using the method of the current invention, including above ground storage tanks, railroad tank cars, holding tanks on ships, and even open tanks, without covers. In fact, any originally double walled tank can be treated as if it were a single walled tank and converted into a double walled tank whose outer wall is the old double walled tank. In this way, leaking double walled tanks could also be repaired by converting them into non-leaking triple walled tanks.

Material 14 may be any material commonly stored in tanks. Thus, material 14 could be gasoline, benzene, an organic solvent, an acid, ammonia, oil, and so on. The material 14 stored in tank 10 is irrelevant for purposes of the present invention, except that, for toxic or otherwise dangerous materials, tank 10 may need to be cleaned prior to conversion using the present method.

If the underground tank shown in FIG. 1 were to be converted, manhole cover 16 would need to be removed to allow entry into tank 10. If no manhole cover 16, or its equivalent, exists, a means of entry will have to be made, using any appropriate method.

Figure 2:
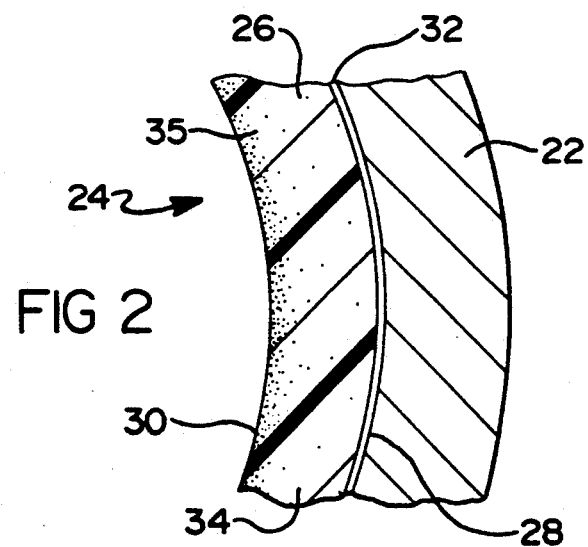
FIG. 2 shows a cross-sectional view of a wall segment of a double walled tank constructed in accordance with the present invention, including an outer wall, a reacted plastic inner wall, and a sensor for monitoring failure of either wall of the double walled tank.

With combined reference to FIGS. 2, 3 and 5, and in accordance with the method of the present invention, the first step of the method is to provide an original in situ single walled tank 10. The original single walled tank 10 will form the outer wall 22 of the resultant double walled tank 24. Double walled tank 24 will eventually have an outer wall 22 and an inner wall 26. Each wall 22 and 26 will have a corresponding respective interior surface 28 and 30.

The second step of the method of the present invention is to install a sensor 32 to monitor failure of either wall 22 and 26 of the resultant double walled tank 24. Sensor 32 consists of a detector 32 and conduit 44 and detects leakage of material 14 or for any foreign substance between or within walls 22 and 26. The presence of any leakage or foreign substance between the walls 22 and 26 of double walled tank 24 will invariably indicate failure of one of the walls. Any appropriate sensor may be used. The present method does not depend upon the sensor chosen. Suitable sensors may include vacuum based sensors as described in more detail below, electroconductive paint, and wires with insulation that causes a short circuit if the insulation corrodes when contacted by material 14 or any other foreign substance, such as moisture from outside the tank, or any other fluid traveling through the surrounding soil, or air (in the case of an above ground tank). Such sensors, or sensing systems, are well known in the art and may be purchased for leak detection. Some of the sensing systems include an analyzer after the detector, for analyzing the type of fluid which has leaked through into the intermediate zone. The analyzer can determine whether or not the inner or outer wall has leaked by analyzing which substance has entered into the intermediate zone.

The third step of the method is to install at least one plastic coating 34 over the interior surface 28 of the outer wall 22 to form the inner wall 26 of the resultant double walled tank 24, the plastic coating 34 being such that at least some of hydrogen atoms in the coating 34 can be replaced by other ions upon reaction.

The preferred sulfonatable plastic coating 34 is an ethylene acrylic acid co-polymer containing between about 10 and 20% weight percent based upon the total weight of the copolymer, and preferably about 20% by weight, of acrylic acid based upon the total weight of the copolymer. The copolymer is applied by spraying a water-based suspension of the copolymer ammonium salt over the layers existing to that point. The sprayed coating may then be dried by circulating warm air over it, as is known in the art. The resulting copolymer is easily sulfonated, and has the additional advantage of being water impermeable.

The fourth step of the method is to react the plastic coating 34 to replace at least some of the hydrogen atoms with other atoms to create a barrier 35 that is substantially impenetrable to the material 14 stored in the resultant double walled tank 24.

The third and the fourth steps above may be accomplished, for instance, by reacting the plastic trioxide gas, or with fluorine. Reacting the plastic coating 34 may be accomplished by contacting a sulfur-containing gas to the interior surface of the inner wall. For example, nitrogen gas may be mixed with up to 5 percent of a hydrogen sulfide gas, and exposing the inner surface to the gas for between about 5 seconds and 5 minutes. In the instance of the use of a fluorinated agent, the preferred way to perform the reaction is to put pure nitrogen gas with about 0.05 to 5 volume percent of fluorine, based upon the total volume of the gas, and contacting the fluorinated nitrogen gas for about 5 seconds to about 5 minutes in order to allow the fluorine to diffuse into the bulk of the interior wall. Plastic coating 34 can also be reacted with a plasma. A plasma reaction may be accomplished by using any number of an activated gas which may include nitrogen, oxygen, argon, helium, or any other gas which may be electrically activated to form a plasma. The plasma gas would also include a sulfonating agent or a fluorinating agent, and would be deposited, adsorbed, and diffuse into and be absorbed into the bulk of the inner wall material of plastic coating 34. Additionally, the plasma may be ignited by radio waves or microwaves. However, some of these methods may suffer from the drawback of being expensive and/or dangerous to the environment or to the operators using the method. Thus, preferably, the third step of the method of the present invention is accomplished by sulfonating the plastic coating 34 to form the inner wall 26 of the resultant double walled tank 24. A plastic is sulfonatable if it will react with $SO_3$ to form $C-SO_3H$ bonds. Polyethylene, polystyrene, polypropylene, polyvinyl, acrylic acid copolymer plastics and many other engineering plastics known to those skilled in the art are sulfonatable. The preferred sulfonatable plastic is ethylene acrylic acid co-polymer containing about 20% by weight of acrylic acid. Typically, sulfonatable plastic coating 34 is applied over sensor 32 or over an area upon which the sensor acts, as will be described later.

Sulfonatable plastic coating 34 need not supply structural strength if the original tank has sufficient strength. This is a tremendous advantage over coating the outside of a tank to create a double walled tank, where the coating may need to supply structural strength as well as withstand a variety of harsh environments. Thus, in addition to saving the costs of having to dig up an old underground tank, thinner, less exotic materials and construction techniques may thus be used in accordance with the method of the present invention simply because coating 34 is being applied to the inside of double walled tank 24.

Preferably, the fourth step of the method of the present invention is accomplished by sulfonating the inner wall 26 to create a sulfonated barrier 35 that is substantially impenetrable to material 14. This barrier is represented in FIGS. 2, 3 and 4 by the dotted area near interior surface 30. Sulfonation is more complete closer to interior surface 30, as shown in the FIGURES.

Sulfonation may be accomplished by any appropriate means. Examples of sulfonation methods and techniques may be found in U.S. Pat. Nos. 4,902,493 and 4,915,912, which are incorporated herein by reference. Basically, the sulfonation technique which is most suitable for this invention includes the exposure of sulfur trioxide gas, either by itself or in combination with a gas which is inert to sulfur trioxide, such as nitrogen, argon or helium, and allowing the gas to remain in contact with the plastic coating for sufficiently long time, between about 5 seconds and 5 minutes, for the plastic coating to become sulfonated. In addition, it is particularly advantageous to create a gas with up to 20 percent sulfur trioxide gas in combination with a gas which is inert to the sulfur trioxide. Moreover, it is of particular advantage to recycle the sulfur trioxide/inert gas composition of gaseous mixture in order to most economically effect sulfonation. Using these techniques and methods, $SO_3$ is diffused into the plastic coating 34 and bonds to it to form barrier layer 35. Barrier layer 35 will be substantially impenetrable to most organic compounds. Barrier layer 35 is relatively inexpensive and easy to create.

Further, performing the present invention of converting existing single walled tank 10 into double walled tank 24 by adding inner wall 26 involves sulfonation in a contained space, which is a critical environmental advantage. Sulfonating a plastic coating added to the outside of an existing single walled tank, without endangering the environment, would be much more problematic, and, perhaps, even impossible.

Referring now to FIG. 4, the molecules of the sulfonated barrier may thereafter be cross-linked by reaction with a divalent or trivalent metal ion to create a more durable barrier 35. Such a reaction with divalent or trivalent metal ions, which may include aluminum, copper, tin or calcium, will create a durable, cross-linked barrier. Zinc and magnesium also can be used, but create a barrier layer which is less water resistant. Barium is very effective but can be toxic, if toxicity is a concern. The cross-linking is performed as described below.

Cross-linking is accomplished by contacting the sulfonated inner wall 26 with an aqueous solution of the divalent or trivalent ionic acetates, chlorides or other water soluble salts as discussed above. For example, metallic acetates are preferred because they can be regenerated quite economically, although other aqueous solutions of chlorides and other water soluble salts of the various divalent or trivalent metals can be used. Essentially, there are two methods which may be employed. The first method includes spraying a dilute solution of the metallic acetate, chloride or other water soluble salt onto the sulfonated inner wall in ambient conditions. On the other hand, the tank may be filled with an aqueous solution for several hours, and may also include some mechanical agitation, by a paddle or other well known means of mechanical agitation.

The most preferable ion to use is calcium. Calcium cross-linking may be accomplished by spraying the sulfonated inner wall 26 with a water spray of 0.1% calcium acetate at standard atmospheric and ambient conditions. Alternatively, tank 24 may be filled with water containing 0.01% calcium acetate for about ten hours, preferably with some mechanical agitation. The reaction will proceed on its own and results in cross-linking, as shown in FIG. 4. Note that, not only are adjacent polymer strands cross-linked together, but the same strand may even be cross-linked to itself.

Without this calcium cross-linking, barrier 35 is still effective, but is less durable and may swell and wear faster, i.e., by cracking at stress points, when certain materials are stored in the double walled tank 24, i.e., gasoline with water contaminants in it. The tougher, more durable cross-linked barrier allows the use of thinner, less costly sulfonatable plastic coatings 34. Of course, other coatings could be used, such as cross-linked epoxys, polyurethanes, and other engineering plastics as described above.

As is shown in FIGS. 3 and 5, it is also preferred to install a stand-off support 36 on interior surface 28 of outer wall 22. Stand-off support 36 will define intermediate zone 38, resulting in the space between outer wall 22 and inner wall 26, wherein fluids and gasses 40 may freely migrate. Thus, any fluids or gasses 40 leaking into intermediate zone 38 may be captured, detected, and analyzed to determine whether one of the walls 22 and 26 has failed and is leaking. Obviously, the presence of material 14 in intermediate zone 38 will be a sign that inner wall 26 of tank 24 has failed. Similarly, the presence of water in intermediate zone 38 will tend to indicate that outer wall 22 of tank 24 has failed when the tank is stored underground or underwater. Basically, the presence of anything in intermediate zone 38 will generally indicate that one of the walls 22 and 16 has failed. Sensor 32 may also include an analyzer unit which may be chosen and calibrated to analyze for the presence of the various leaking substances.

Stand-off support 36 may be constructed of any suitable material, as long as it defines intermediate zone 38. Thus, known wire, plastic and metal meshes or grids may be used. Additionally, known fiber and woven or non-woven fabric meshes may be used. These latter meshes will compact when double walled tank 24 is filled with material 14, but the mesh will still allow fluid and gas migration therethrough. If a sturdy grid is used, this may necessitate the use of a more sturdy sulfonatable plastic coating 34.

In another embodiment, it is preferred to create a partial vacuum 42 within intermediate zone 38. Partial vacuum 42 may be used to capture any fluids or gasses 40 which are migrating through intermediate zone 38. These captured fluids and gasses 40 may be delivered by conduit 44 to the sensor 32, which can detect the captured fluids and gases to detect failure of either of the walls 22 and 26.

One preferred way of creating partial vacuum 42 within intermediate zone 38 is to install fluid and gas collection tubes 46, as shown in FIG. 3, and to connect tubes 46 to a vacuum source 48 to create partial vacuum 42 in intermediate zone 38. Such systems are known in the art.

Referring now to FIG. 5, there is shown a tank resulting from another method embodiment which discloses an alternative method for converting an in situ single walled tank 10 into a resultant double walled tank 24 for storing a material 14. The resultant double walled tank 24 will again have an outer wall 22 and an inner wall 26. Each wall 22 and 26 of resultant double walled tank 24 will also again have interior surfaces 28 and 30.

The first step of the method of this alternative embodiment of the present invention is to provide the in situ single walled tank 10. The original single walled tank 10 will form outer wall 22 of the resultant double walled tank 24. The second step of the method of this alternative embodiment of the present invention is to install a sensor 32 to monitor failure of either wall 22 and 26 of the resultant double walled tank 24. Sensor 32 again detects the presence of material 14 being stored in double walled tank 24 or for some other foreign substance between or within walls 22 and 26. The presence of any detectable substance between walls 22 and 26 will invariably indicate failure of one of the walls.

The third step of the method of this alternative embodiment of the present invention is to apply a film-stand-off support laminate 50 to inner surface 28 of outer wall 22. The film portion 52 of film-stand-off support laminate 50 is a sulfonatable plastic and will form inner wall 26 of tank 24. The stand-off support portion 54 of film-stand-off support laminate 50 is similar to stand-off support 36 described above. It again defines an intermediate zone 38 that allows fluid migration throughout the intermediate zone 38. The sensor acts in this intermediate zone 38 to detect any failure of the walls 22 and 26.

Film-stand-off support laminates 50 are known in the art and are readily available. Using such laminates 50 allows speedy conversion of the single walled tank 10 to the double walled tank 24. Further, stand-off support portions 54 will be compressible if a fabric or similar mesh is used, whereby a thin film portion 52 may be used in most circumstances. This means that conversion under this embodiment can be done both quickly and efficiently.

The fourth step of the method of this alternative embodiment of the present invention is to sulfonate the inner wall 26 of tank 24 to create barrier 35 that is substantially impenetrable to material 14 stored in the tank. The sulfonation would be carried out as is described above with reference to the first embodiment.

Again, it is preferred to create a partial vacuum 42 in intermediate zone 38 and to use the partial vacuum 42 to capture fluids 40 which are migrating in intermediate zone 38. Captured fluids may then be delivered by conduit 44 to sensor 32, which detects and analyzes captured fluids to ascertain failure of either wall 22 or 26. Again, this is preferably done by using fluid and gas collection tubes 46, as described above. It is also again preferred to cross-link the molecules of the sulfonated inner wall 26 with a divalent or trivalent metal ion, again, preferably calcium.

Under any of the above embodiments, the interior surface 30 of outer wall 28 must be clean and repaired prior to conversion. Any appropriate cleaning and repair techniques may be used if such cleaning or repairing is necessary. Good adhesion of subsequently applied layers requires a clean substrate.

It is also possible, within any of the above embodiments, to apply at least one adhesive layer 60 to the interior surface 28 of outer wall 22 for adhesion of subsequent layers. The water-based spray of the suspension of polyethylene co-acrylic acid ammonium salt described above may be used as such an adhesive. When this suspension is partially dried, it leaves a tacky surface to which subsequent layers may be attached.

Finally, a protective coating 58 may also be added as a last step in any of the above embodiments. Any appropriate coating 58 known in the art may be used, so long as the coating is resistant to the material 14 being stored in the tank 10 and to any anticipated possible rupturing or mechanical damage. Examples of acceptable protective coatings include ethylene acrylic copolymers, film-forming latexes, such as polyvinyl chloride, styrene, butadiene, and acrylic, and solvent based coatings such as varnishes and paints.

The above completes the description of the method portion of the present invention. The following paragraphs refer to the article of manufacture portion of the present invention.

With combined reference to FIGS. 2, 3 and 5, a double walled tank 24 is shown including inner and outer walls 22 and 26. Walls 22 and 26 have interior surfaces 28 and 30, respectively. Double walled tank 24 is for storing a material 14 and for detecting failure of either wall 22 or 26 of the tank 24. Double walled tank 24 includes an original single walled tank 10, which becomes outer wall 22 after the conversion. Double walled tank 24 also may include a stand-off support 36 which defines an intermediate zone 38 and allows fluid and gas migration throughout intermediate zone 38. A sensor 32 is included to detect fluid and gas migration within intermediate zone 38 and to determine when either wall 22 or 26 of double walled tank 24 has failed.

Finally, double walled tank 24 includes at least one sulfonated plastic coating 34 which forms inside wall 26, which is impenetrable to the material 14.

Preferred stand-off supports 36 include metal, plastic, fiber, or woven or non-woven fabric mesh. Usually, a partial vacuum 42 is produced in intermediate zone 38 and used to capture fluids and gases which are migrating therein. These fluids and gases are detected and analyzed by sensor 32 to detect failure of either of the walls 22 and 26. A network of fluid and gas collection tubes 46 may be installed in intermediate zone 38 to create partial vacuum 42 and to detect failure quickly and efficiently within the entire intermediate zone 38. Ethylene acrylic acid co-polymer containing about 20% by weight of acrylic acid, based upon the total weight of the total copolymer weight, is the preferred plastic inner coating material. It is also preferred that the molecules of the sulfonated plastic inner coating be cross-linked by reaction with a divalent or trivalent metal ion, preferably calcium, as described above.

Consequently, the objects of the present invention are accomplished by providing a method for in situ conversion of a single walled tank into a double walled tank in an economical and environmentally safe way. In addition, the resultant double walled tank is also described and claimed. Therefore, a new and improved double walled tank and method for making the same is disclosed and claimed.

While the present invention has been described in terms of specific embodiments, it will be appreciated that other embodiments could readily be adapted by one skilled in the art. Accordingly, the scope of the present invention is to be limited only by the following claims.

What is claimed is:

1. A method for in situ conversion of an original single walled tank into a resultant double walled tank for storing a material, the resultant double walled tank to have an outer wall, an inner wall, and an intermediate zone therebetween, with each wall having an interior surface, comprising:
   providing the original single walled tank for in situ conversion into the resultant double walled tank, the original single walled tank to form the outer wall of the resultant double walled tank;
   installing at least one plastic coating including hydrogen atoms over the interior surface of the outer wall to form the inner wall of the resultant double walled tank, the plastic coating being such that at least some of the hydrogen atoms in the plastic coating can be replaced with other atoms upon reaction;
   installing a sensor in communication with the intermediate zone to monitor failure of either wall of the resultant double walled tank; and
   reacting the plastic coating to place at least some of the hydrogen atoms with the other atoms to create a barrier that is substantially impenetrable to the material stored in the resultant double walled tank.

2. The method of claim 1, further comprising installing a stand-off support on the interior surface of the outer wall which defines the intermediate zone between the outer wall and the inner wall wherein fluids and gases may freely migrate.

3. The method of claim 2, where the step of installing a stand-off support on the interior surface of the outer wall is accomplished by installing a stand-off support made of a material selected from the group consisting of metal, plastic, fiber, woven, and non-woven fabric mesh.

4. The method of claim 2, further comprising creating a partial vacuum within the intermediate zone, using the partial vacuum to capture fluids and gases which are migrating within the intermediate zone, and delivering the captured fluids and gases to the sensor, which detects failure of the walls.

5. The method of claim 4, further comprising installing fluid and gas collection tubes in the intermediate zone and connecting the collection tubes to a vacuum source to create the partial vacuum within the intermediate zone.

6. The method of claim 1, wherein the step of installing at least one plastic coating is accomplished by installing at least one sulfonatable plastic coating, and further wherein the step of reacting the plastic coating is accomplished by sulfonating the inner wall to create a barrier that is substantially impenetrable to the material stored in the resultant double walled tank.

7. The method of claim 6, wherein the sulfonatable plastic is an ethylene acrylic acid copolymer containing about 20% by weight of acrylic acid based upon the total weight of the copolymer.

8. The method of claim 2, wherein the step of installing at least one plastic coating is accomplished by installing at least one fluorinatable plastic coating, and further wherein the step of reacting the plastic coating is accomplished by fluorinating the inner wall to create a barrier that is substantially impenetrable to the material stored in the resultant double walled tank.

9. A method for in situ conversion of an original single walled tank into a resultant double walled tank for storing material, the resultant double walled tank to have an outer wall, an inner wall, and an intermediate zone therebetween with each wall having an interior surface, comprising:
   providing the original single walled tank for in situ conversion into the resultant double walled tank, the resultant double walled tank;
   installing at least one sulfontable plastic coating over the interior surface of the outer wall to form the inner wall of the resultant double walled tank;
   installing a sensor in communication with the intermediate zone to monitor failure of either wall of the resultant double walled tank; and
   sulfonating the inner wall to create a barrier that is substantially impenetrable to the material stored in the resultant double walled tank; and
   cross-linking the molecules of the sulfonated inner wall to create a durable barrier by reaction with a chemical compound containing a metallic ion selected from the group consisting of divalent and trivalent metal ions.

10. The method of claim 9, further comprising installing a stand-off support on the interior surface of the outer wall which defines the intermediate zone between the outer wall and the inner wall wherein fluids and gases may freely migrate.

11. The method of claim 10, wherein the step of installing a stand-off support on the inner surface of the outer wall is accomplished by installing a stand-off support made of a material selected from the group consisting of metal, plastic, fiber, woven, and non-woven fabric mesh.

12. The method of claim 10, further comprising creating a partial vacuum within the intermediate zone, using the vacuum to capture fluids and gases which are migrating within the intermediate zone, and delivering the captured fluids and gases to the sensor, which detects failure of either of the walls.

13. The method of claim 12, further comprising installing fluid and gas collection tubes in the intermediate zone and connecting the collection tubes to a vacuum source to create the partial vacuum within the intermediate zone.

14. The method of claim 9, wherein the sulfonatable plastic is an ethylene-acrylic acid copolymer containing about 20% by weight of acrylic acid based upon the total weight of the copolymer.

15. The method of claim 9, wherein the metallic cross-linking ion is selected from the group consisting of magesium, copper, tin, zinc, magnesium, and calcium.

16. A method for in situ conversion of an original single walled tank into a resultant double walled tank for storing a material, the resultant double walled tank to have an outer wall, an inner wall, and an intermediate zone therebetween, with each wall having an interior surface, comprising:
   providing the original single walled tank for in situ conversion into the double walled tank, the original single walled tank to form the outer wall of the resultant double walled tank;
   installing a sensor in communication with the intermediate zone to monitor fluid and gas migration within the intermediate zone to detect failure of either wall of the resultant double walled tank;
   applying a film stand-off support laminate to the inner surface of the outer wall, the film portion of the film stand-off support laminate being a sulfonatable plastic and forming the inner wall of the double walled tank, while the stand-off support portion of the film stand-off support laminate defines the intermediate zone which allows fluid and gas migration throughout the intermediate zone thus defined; and
   sulfonating the plastic inner wall to create a barrier that is substantially impenetrable to the material stored in the double walled tank.

17. The method of claim 16, further comprising creating a partial vacuum within the intermediate zone, using the vacuum to capture fluids and gases which are migrating within the intermediate zone, and delivering the captured fluids and gases to the sensor which detects failure of either of the walls.

18. The method of claim 17, further comprising installing fluid and gas collection tubes in the intermediate zone and connecting the collection tubes to a vacuum source to create the partial vacuum within the intermediate zone.

19. The method of claim 16, wherein the sulfonatable plastic is an ethylene-acrylic acid copolymer containing about 20% by weight acrylic acid.

20. The method of claim 16, further comprising the step of cross-linking the molecules of the sulfonated inner wall to create a durable barrier by reaction with a chemical compound containing a metallic ion selected from the group consisting of divalent and trivalent metal ions.

21. The method of claim 20, wherein the metallic cross-linking ion is selected from the group consisting of aluminum, copper, tin, zinc, magnesium, and calcium.

22. The method of claim 16, wherein the stand-off support portion of the film stand-off support laminate is made of a material selected from the group consisting of metal, plastic, fiber, woven, and non-woven fabric mesh.

23. A method for in situ conversion of an original single walled tank into a resultant double walled tank for storing a material, the resultant double walled tank to have an outer wall, an inner wall, and an intermediate zone therebetween, with each wall having an interior surface, comprising:

providing the original single walled tank for in situ conversion into the double walled tank, the original single walled tank to form the outer wall of the resultant double walled tank;

cleaning and repairing the interior surface of the outer wall;

applying an adhesive layer to the interior surface of the outer wall;

installing fluid and gas collection tubes to the interior surface of the outer wall by pressing them to the adhesive layer;

installing a stand-off support on the interior surface of the outer wall around the fluid and gas collection tubes by pressing the support to the adhesive layer, the support defining an intermediate zone for fluid and gas migration between the walls of the resultant double walled tank;

providing a sensor in communication with the intermediate zone.

installing a sulfonatable plastic coating over the stand-off support, thereby forming the inner wall of the resultant double walled tank;

sulfonating the plastic inner wall to create a barrier that is substantially impenetrable to the material stored in the double walled tank;

cross-linking the molecules of the sulfonated inner wall to create a durable barrier by reaction with calcium;

connecting the fluid and gas collection tubes to a vacuum source to produce a partial vacuum in the intermediate zone and to capture fluids and gases migrating within the intermediate zone; and delivering the captured fluids and gases to a sensor to detect failure of either of the walls.

24. The method of claim 23, further comprising a step of applying an adhesive layer by spraying a suspension of polyethylene co-acrylic acid ammonium salt on the interior surface of the outer wall and slightly drying the adhesive layer to leave a tacky surface.

25. The method of claim 24, further comprising the step of drying the adhesive layer after the sulfonatable plastic coating is installed to create a water impermeable barrier.

26. A double walled tank including an inner and an outer wall, with each wall having an interior surface, the tank for storing a material and for detecting failure of either wall of the double walled tank, comprising:

an original single walled tank, which forms the outer wall of the resultant double walled tank;

a stand-off support, attached to the interior surface of the outer wall, the support defining an intermediate zone and allowing fluid and gas migration throughout the intermediate zone thus defined;

a sensor in communication with the intermediate zone which detects fluid and gas migration within the intermediate zone to determine when either wall of the double walled tank has failed; and at least on plastic coating forming the inner wall of the double walled tank, the plastic coating being such that at least some of the hydrogen atoms in the plastic coating can be replaced with other atoms upon reaction to form a barrier which is impenetrable to the material stored in the double walled tank.

27. The double walled tank of claim 26, wherein the stand-off support is made of a material selected from the group consisting of metal, plastic, fiber, woven, and non-woven fabric mesh.

28. The double walled tank of claim 26, further comprising means for capturing fluids and gases which are migrating within the intermediate zone and delivering them to the sensor for detection of failure of either of the walls.

29. The double walled tank of claim 28, wherein the means for capturing fluids and gases includes fluid and gas collection tubes within the intermediate zone which are connected to a vacuum source and which capture fluids and gases which are migrating within the intermediate zone and deliver them to the sensor for detection of failure of either of the walls.

30. The double walled tank of claim 26, wherein the plastic coating is a sulfonatable plastic coating selected from the group consisting of polyethylene, polystyrene, polypropylene, polyvinyl, and ethylene-acrylic acid copolymer containing about 20% by weight acrylic acid.

31. The double walled tank of claim 26, wherein the molecules on the inner surface of the inner wall are cross-linked to create a durable barrier by reaction with a chemical compound containing a metal ion selected from the group consisting of divalent or trivalent metal ions.

32. The double walled tank of claim 31, wherein the cross-linking metallic ion is selected from the group consisting of aluminum, copper, tin, zinc, magnesium, and calcium.

33. The double walled tank of claim 26, further comprising an adhesive layer located on the interior surface of the double walled tank so that the stand-off support may be attached to the adhesive layer by pressing the support to the adhesive layer.

34. The double walled tank of claim 33, wherein the adhesive layer is a polyethylene co-acrylic acid ammonium salt.

* * * * *

UNITED STATES PATENT AND TRADEMARK OFFICE
CERTIFICATE OF CORRECTION

PATENT NO. : 5,261,764
DATED : November 16, 1993
INVENTOR(S) : Wilhelm E. Walles It is certified that error appears in the above-indentified patent and that said Letters Patent is hereby corrected as shown below:

Column 1, line 15-16, "widely used" should be between "been --- to store" not after "materials"
Column 7, line 60-63, "coating 34 with a sulfonating agent, such sulfur" should be place between "Plastic" and "trioxide"
Column 13, line 39-40, "the original single walled tank to form the outer wall of" should be placed between "tank, --- the"
Column 14, line 15, "magesium" should be "aluminum"

Signed and Sealed this

Thirty-first Day of May, 1994

Attest:

BRUCE LEHMAN

Attesting Officer     Commissioner of Patents and Trademarks